US005747784A

United States Patent [19]

Walter et al.

[11] Patent Number: 5,747,784

[45] Date of Patent: May 5, 1998

[54] METHOD AND APPARATUS FOR ENHANCING SECURITY IN A SELF-SERVICE CHECKOUT STATION

[75] Inventors: Joanne S. Walter; Tracy L. Flynn, both of Alpharetta, Ga.

[73] Assignee: NCR Corporation, Dayton, Ohio

[21] Appl. No.: 735,424

[22] Filed: Oct. 22, 1996

[51] Int. Cl.[6] .......... G06F 17/00

[52] U.S. Cl. .......... 235/383; 235/467; 235/472

[58] Field of Search .......... 235/383, 467, 235/472

[56] References Cited

U.S. PATENT DOCUMENTS

| | | | |
|---|---|---|---|
| 4,676,343 | 6/1987 | Humble et al. | 186/61 |
| 4,779,706 | 10/1988 | Mergenthaler | 186/61 |
| 4,787,467 | 11/1988 | Johnson | 177/50 |
| 4,792,018 | 12/1988 | Humble et al. | 186/61 |
| 4,909,356 | 3/1990 | Rimondi et al. | 186/61 |
| 4,929,819 | 5/1990 | Collins, Jr. | 235/383 |
| 4,964,053 | 10/1990 | Humble | 364/466 |
| 5,083,638 | 1/1992 | Schneider | 186/61 |
| 5,115,888 | 5/1992 | Schneider | 186/61 |
| 5,191,749 | 3/1993 | Cappi et al. | 53/502 |
| 5,256,864 | 10/1993 | Rando et al. | 235/462 |
| 5,340,970 | 8/1994 | Wolfe, Jr. et al. | 235/383 |
| 5,426,282 | 6/1995 | Humble | 235/383 |
| 5,494,136 | 2/1996 | Humble | 186/61 |
| 5,497,314 | 3/1996 | Novak | 364/403 |

*Primary Examiner*—Harold Pitts
*Attorney, Agent, or Firm*—Maginot & Addison

[57] ABSTRACT

A method and apparatus for checking out an item through a self-service checkout station which includes a scanner which generates a first signal when the scanner detects a machine readable code associated with an item, a sensor which generates a second signal when the sensor detects a motion used to scan the item across the scanner, a recorder which generates a visual recording of the motion used to scan the item across the scanner, and a processing unit coupled to the scanner, the sensor and the recorder which causes the recorder to playback the visual recording on a display monitor when the processing unit receives the second signal but not the first signal.

18 Claims, 3 Drawing Sheets

METHOD AND APPARATUS FOR ENHANCING SECURITY IN A SELF-SERVICE CHECKOUT STATION

BACKGROUND OF THE INVENTION

The present invention relates generally to checkout or point-of-sale (POS) stations, and more particularly to a method and apparatus for enhancing security in a self-service checkout station.

In the retail industry, the largest expenditures are typically the cost of the goods sold followed closely by the cost of labor expended. With regard to the retail grocery or supermarket industry, the impetus to reduce labor costs has been focused on reducing or eliminating the amount of time required to handle and/or process the goods to be purchased by a customer. To this end, there have been a number of self-service checkout station concepts developed which substantially eliminate the need for a checkout clerk.

A self-service checkout station is a system which is operated by a customer without the aid of a checkout clerk. In such a system, the customer scans individual items for purchase across a scanning device and then places the scanned item into a grocery bag, if desired. The customer then pays for his or her purchase either at the self-service checkout station if so equipped, or at a central payment area which is staffed by a store employee. Thus, a self-service checkout station permits a customer to select, itemize, and in some cases pay for his or her purchase without the assistance of the retailer's personnel.

A customer typically has little or no training in the operation of a self-service checkout station prior to his or her initial use of the checkout station. One concern that retailers have when evaluating a self-service checkout station is the level of supervision provided to inexperienced consumers.

It is also known that some customers may have illicit intentions when using a self-service checkout station. In traditional checkout systems, the clerk employed by the retailer to operate the checkout system provides a level of security against theft or other improprieties. However, in the case of a self-service checkout station, the system itself must provide the necessary supervision and security. Such supervision and security includes preventing a consumer from either inadvertently or intentionally placing an item in a grocery bag without scanning the item, or scanning one item, but placing a second item of greater value in the bag. Thus, another concern when evaluating a self-service checkout station is the level of security provided against illicit use of the self-service checkout station by customers.

What is needed therefore is a solution which assists or otherwise supervises a customer in the use and operation of a self-service checkout station, and which provides a self-service checkout station with security from theft and other improprieties.

SUMMARY OF THE INVENTION

In accordance with one aspect of the present invention, there is provided a self-service checkout station including a scanner which generates a first signal when the scanner detects a machine readable code associated with an item, a sensor which generates a second signal when the sensor detects a motion used to scan the item across the scanner, a recorder which generates a visual recording of the motion used to scan the item across the scanner, and a processing unit coupled to the scanner, the sensor and the recorder which causes the recorder to playback the visual recording on a display monitor when the processing unit receives the second signal but not the first signal.

In accordance with a second aspect of the present invention, there is provided a method for checking out an item through a self-service checkout station. The method includes the steps of generating a first signal when a scanner detects a machine readable code associated with an item, generating a second signal when a sensor detects a motion used to scan the item across the scanner, visually recording the motion used to scan the item across the scanner, and playing-back the visual recording on a display monitor when a processing unit receives the second signal but not the first signal.

It is therefore an object of the present invention to provide a new and useful self-service checkout station.

It is another object of the present invention to provide an improved self-service checkout station.

It is another an object of the present invention to provide a new and useful method for checking out an item through a self-service checkout station.

It is another object of the present invention to provide an improved method for checking out an item through a self-service checkout station.

It is another object of the present invention to provide a method and apparatus for assisting or otherwise supervising a customer in the use and operation of a self-service checkout station.

It is another object of the present invention to provide a method and apparatus for which provides a self-service checkout station with security from theft and other improprieties.

The above and other objects, features, and advantages of the present invention will become apparent from the following description and the attached drawings.

DETAILED DESCRIPTION OF THE INVENTION

Figure 1:
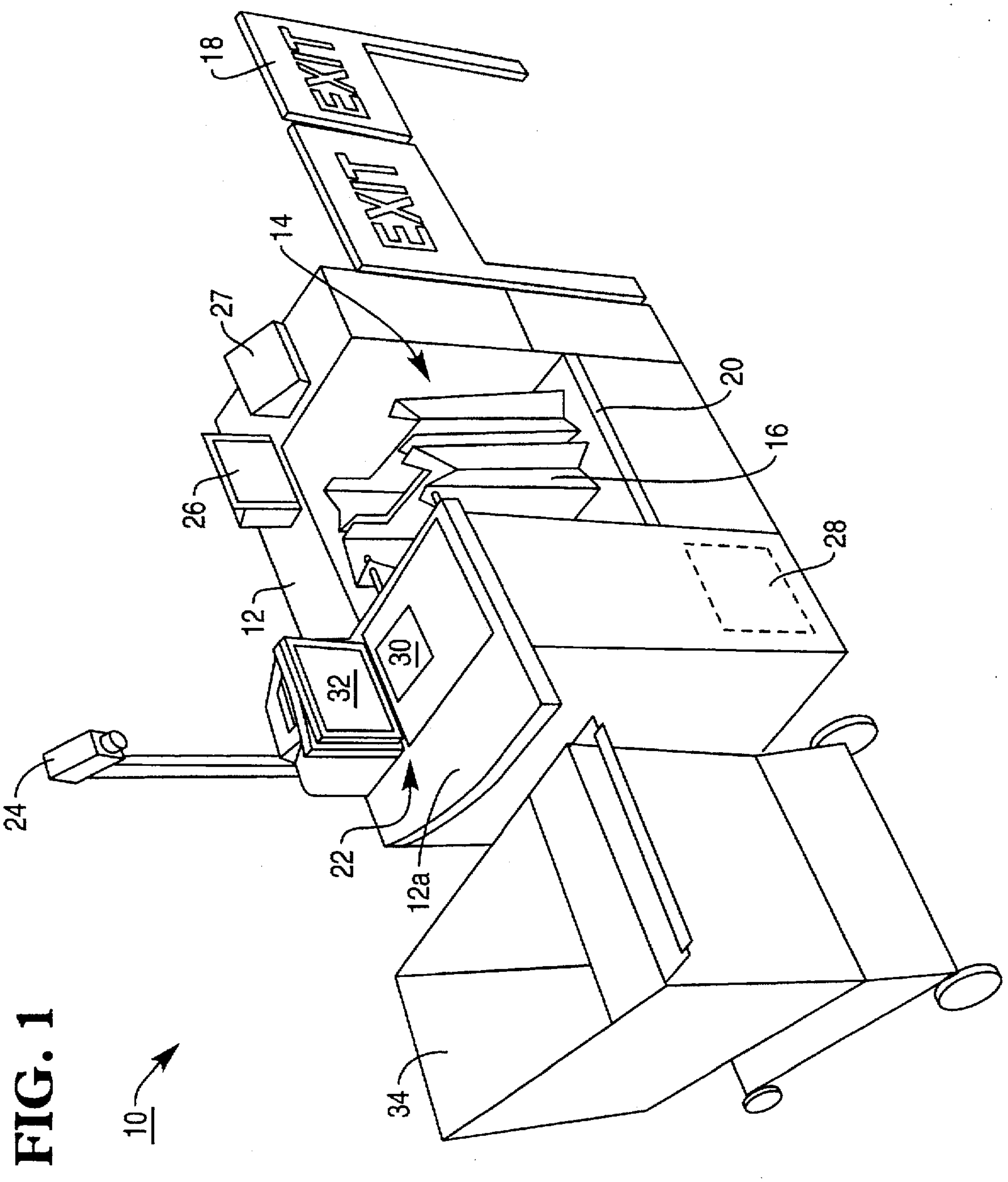
FIG. 1 is a perspective view of a self-service checkout station which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown an exemplary self-service checkout station 10 for use in a retail business such as a grocery store. The self-service checkout station 10 may include a counter 12, recess 14 for accommodating one or more containers 16, exit gate 18, weight scale 20 positioned within the recess 14, scanner device 22, video camera 24, display monitor 26, data input device 27, and processing unit 28. The containers 16 may be plastic, paper, or cloth grocery bags or sacks, or may be boxes, cartons, or the like.

The scanner device 22 conventionally scans or reads a product identification code such as a Universal Product Code (UPC), industrial symbol(s), alphanumeric character (s), or other indicia associated with an item to be purchased. In particular, the scanner device 22 includes a first scanning window 30 and a second scanning window 32. The first scanning window 30 is disposed flush-mounted relative to an upper surface 12*a* of the counter 12. The second scanning window 32 is disposed in substantially perpendicular fashion to the upper surface 12*a* of the counter 12.

The scanner device 22 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner device 22, the scanning light beams scatter off the code and are returned to the scanner device 22 where they are collected and detected. The reflected light is then analyzed electronically in order to determine whether the reflected light contains a valid product identification code pattern. If a valid code pattern is present, the product identification code is then converted into pricing information which may then be used to determine the cost of the item in a known manner.

The video camera 24 may be disposed above the counter 12 and positioned for detecting motion within a "target area" of the video camera 24. What is meant herein by use of the term "target area" of the video camera 24 is an area adjacent to the first and second scanning windows 30, 32 which defines the maximum range in which an item can be successfully scanned as it is passed across the scanner device 22. The video camera 24 may be the same as or similar to video cameras which are used in Automatic Teller Machines (ATMs) to monitor the use thereof.

The video camera 24 may be included with image processing software which can determine if and when an object passes across the target area of the video camera. Imaging software suitable for use with the video camera 24 is disclosed in U.S. patent application Ser. No. 08/694,365 which was filed on Aug. 8, 1996, by Ming, and which is assigned to the same assignee of the present invention.

The display monitor 26 displays instructions which serve to guide a customer through a checkout procedure. For example, an instruction may be displayed on the display monitor 26 which instructs the customer to remove an item from a grocery cart or trolley 34 and pass the item over the scanner device 22. If the scanner device 22 successfully scans or reads the bar code associated with the item, then a visual indication may be generated on the display monitor 26. If for any reason the scanner device 22 cannot read or otherwise determine the bar code associated with the item, a visual error message may be generated on the display monitor 26 as described further below. Moreover, the display monitor 26 may be a known touch screen monitor which can generate data signals when certain areas of the screen are touched by a user. In addition to, or in lieu of, the display monitor 26, a means for generating audio or voice instructions may be provided.

The weight scale 20 may optionally weigh the contents of the one or more of the grocery bags 16 which may be placed on the weight scale 20 during a checkout procedure. The weight scale 20 may be used for monitoring the insertion of items into and the removal of items from the grocery bags 16 as described further below.

Figure 2:
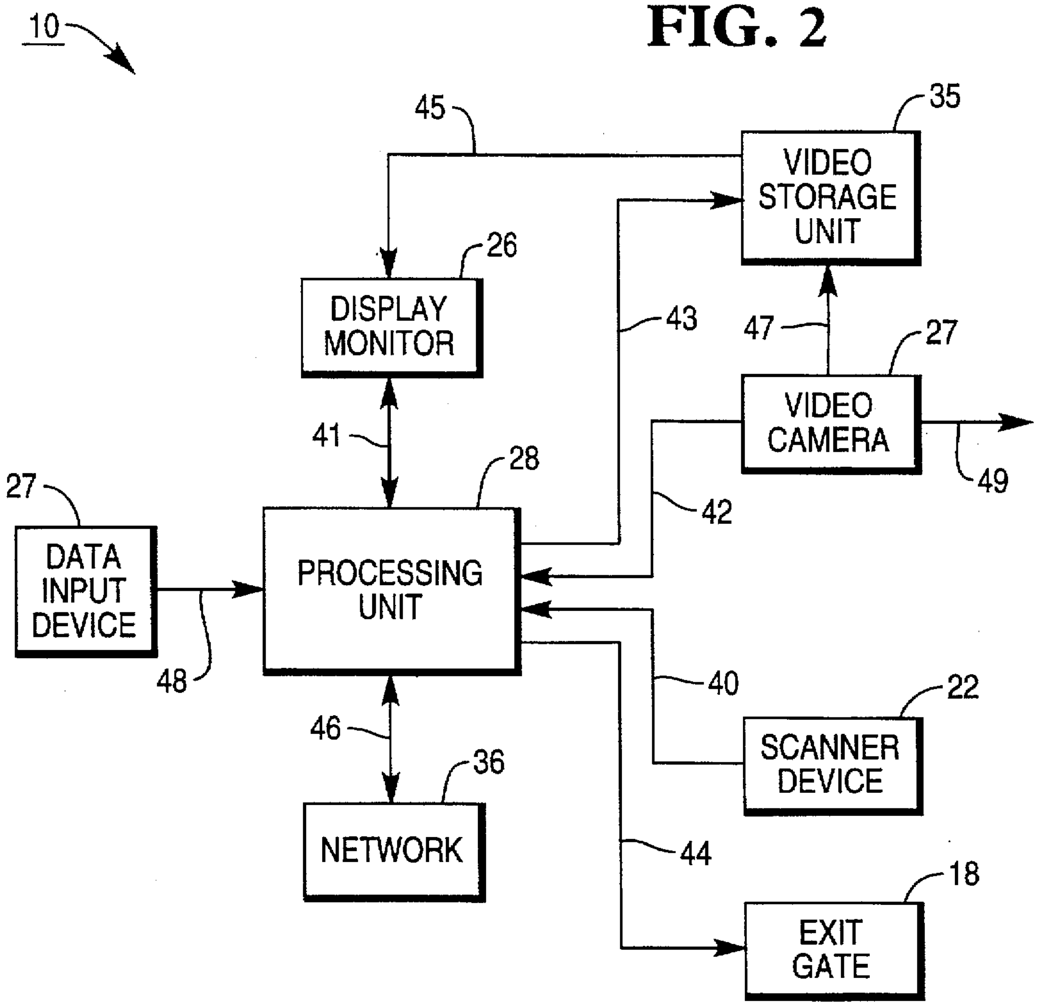
FIG. 2 is a simplified block diagram of the self-service checkout station shown in FIG. 1.

Referring now to FIG. 2, there is shown a simplified block diagram of the self-service checkout station 10. The processing unit 28 may be electrically connected to the exit gate 18, scanner device 22, video camera 24, display monitor 26, and data input device 27. The processing unit 28 may also be electrically connected to a video storage unit 35 and a network 36.

The processing unit 28 monitors output signals generated by the scanner device 22 and the video camera 24 through communication lines 40 and 42, respectively, so as to supervise and provide security monitoring of a checkout procedure as described further below with regard to FIGS. 3–6.

The video camera 24 may be connected to the video storage unit 35 via one or more communication lines 47. The video storage unit 35 may conventionally store video signals which are captured by the video camera 24 and sent to the video storage unit 35 on line 47. In particular, the video storage unit 35 may include a video recording device which may be the same as or similar to the video recording devices used in Automatic Teller Machines (ATMs) to record the use thereof. In addition, the video storage unit 35 may include a digital imaging device which conventionally stores single-frame digital images of an object being passed through the target area of the video camera 24.

The processing unit 28 may be connected to the video storage unit 35 through one or more communication lines 43. The processing unit 28 may control the video storage unit 35 to playback a stored video sequence when the video camera 24 detects a scanning motion across the scanner device 22 but the scanner device 22 does not capture the product identification code associated with the apparently scanned item.

The video storage unit 35 may respond to the playback request from the processing unit 28 by sending the stored video signal to the display monitor 26 through a communication line 45. The video camera 24 may also be connected to a central monitoring area within the store through a communication line 49 for real time or delayed monitoring of a checkout procedure.

The processing unit 28 may communicate with the display monitor 26 through a data communication line 41. The processing unit 28 generates output signals on the data communication line 41 which cause various instructional messages to be displayed on the display monitor 26. The display monitor 26 may include known touch screen technology which can generate output signals when the customer touches a particular area of the display screen associated with the display monitor 26. The signals generated by the display screen may be transmitted to the processing unit 28 via data communication line 41.

The processing unit 28 includes network interface circuitry (not shown) which conventionally permits the self-service checkout station 10 to communicate with the network 36 such as a LAN or WAN through a wired connection 46. The processing unit 28 may communicate with the network 36 during a checkout procedure in order to obtain information such as pricing information on an item scanned, and customer credit approval where appropriate. The network interface circuitry associated with the self-service checkout station 10 may include a known Ethernet expansion card, and the wired connection 46 may include a known twisted-pair communication line. Alternatively, the network interface circuitry may support wireless communications with the network 36.

The data input device 27 is connected to the processing unit 28 through a data communication cable 48. The data input device 27 may include one or more of a known keypad, touch pad, credit/debit card reader, smart card reader, etc. The processing unit 28 may communicate with the exit gate 18 through a data communication line 44 to direct the exit gate 18 to open at the completion of a successful checkout procedure, thereby permitting a customer to exit from the self-service checkout station 10. It should be appreciated that the communication lines 40, 43, 43, 45, 46, 49 may communicate one or more control signals, audio signals and/or video signals between the various components of the self-service checkout station 10 as described above.

Figure 3:
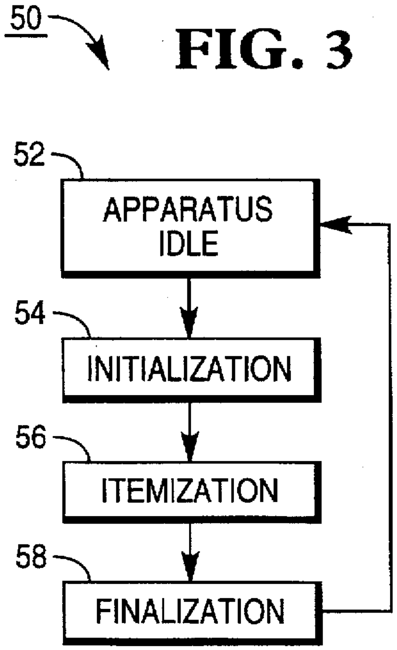
FIG. 3 is a flowchart setting forth a general procedure for checking out items through the self-service checkout station shown in FIG. 1.

Referring now to FIG. 3, there is shown a flowchart which sets forth a general procedure 50 for checking out items through the self-service checkout station 10. When a customer arrives at the self-service checkout station 10, the self-service checkout station 10 may be in an idle state (step 52). An initialization step 54 may be executed prior to checking out items for purchase. In particular, one or more initialization instructions may be displayed on the display monitor 26 which may instruct the customer to (1) select a desired method of payment, and (2) identify himself or herself, by inserting a shopping card, debit card, credit card, smart card, etc. into the data input device 27.

At the completion of the initialization step 54, the routine 50 advances to an itemization step 56 where the customer scans the individual items for purchase across the scanner device 22. After all of the items for purchase have been scanned, the routine 50 advances to a finalization step 58 where a grocery receipt may be printed, payment may be tendered, a credit card or debit card account may be charged, or a smart card may be decremented. After completion of the finalization step 58, the routine 50 returns to step 52 wherein the self-service checkout station 10 remains in an idle condition until another customer initiates a checkout procedure.

Figure 4:
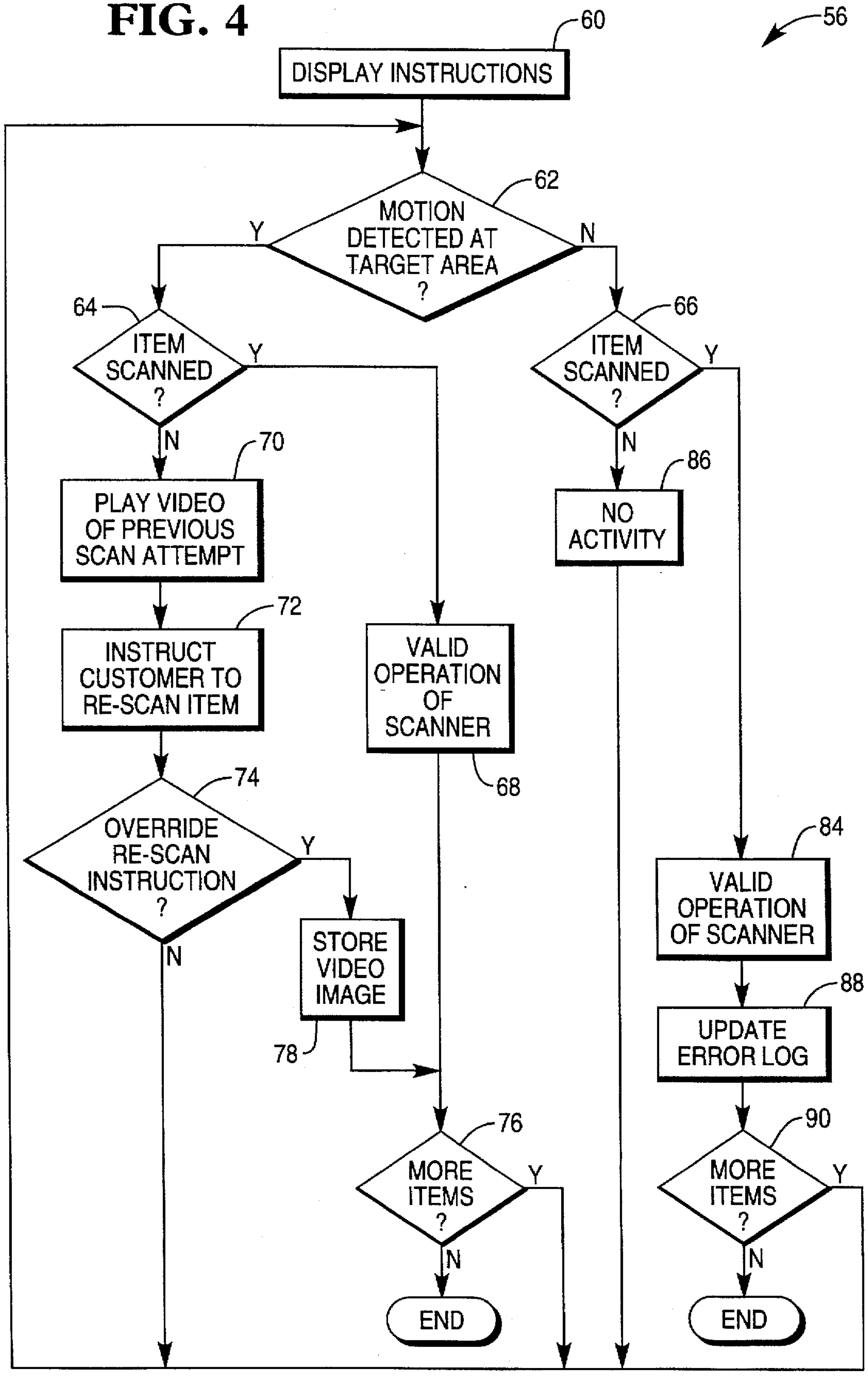
FIG. 4 is a flowchart setting forth in detail an itemization step for the checkout procedure shown in FIG. 3.

Referring now to FIG. 4, there is shown a flowchart setting forth the itemization step 56 in greater detail. After the initialization step 54 (FIG. 3) is completed, the routine 56 advances to step 60 where a message may be displayed on the display monitor 26 which instructs the customer to pass or otherwise scan individual items across or adjacent the scanning device 22 with the product identification code facing downwardly or rearwardly.

The routine 56 then advances to step 62 where the processing unit 28 scans or reads the data communication line 42 to determine whether the imaging software associated with the video camera 24 has detected the customer scanning an item across the target area associated with the scanner device 22. In particular, the video camera 24 generates an output signal which is sent to the processing unit 28 once the video camera 24 detects the motion of the customer scanning the item across the scanner device 22. If a scanning motion is detected, the routine 56 advances to step 64. If a scanning motion is not detected, the routine 56 advances to step 66.

In step 64, the processing unit 28 scans or reads the data communication line 40 to determine whether the scanner device 22 has successfully read or otherwise captured the bar code associated with the item that was scanned. That is, the scanner device 22 generates an output signal which is sent to the processing unit 28 once the scanner device 22 successfully reads the product identification code off of the item scanned. If the code is successfully read from the item, the routine 56 advances to step 68. If the code is not successfully read from the item, the routine 56 advances to step 70.

In step 68, the processing unit 28 determines that a successful checkout operation has been completed for the particular item selected for purchase. That is, the processing unit 28 concludes that the customer apparently scanned an item over the scanner device 22 because the video camera 24 generated an output signal on data communication line 42, and that the item was in fact scanned because the scanner device 22 generated an output signal on the data communication line 40. The processing unit 28 may then communicate with the network 36 to obtain the price of the properly scanned item for use in generating a bill or receipt at the end of the checkout procedure. The routine 56 then advances to step 76.

In step 76, the processing unit 28 may monitor communication line 48 from the data input device 27, communication line 41 from the display monitor 26, communication line 42 from the video camera 24, and communication line 40 from the scanner device 22 in order to determine whether there are more items to be scanned. In particular, a message may be displayed on the display monitor 26 instructing the customer to touch a particular touch screen area displayed on the display monitor 26, or to touch a particular key associated with the data input device 27, when the customer has completed scanning all of the items for purchase.

If a particular signal is detected on either of communication lines 41 or 48, the processing unit 28 determines that the checkout procedure is complete and the routine 56 advances to the finalization step 58 (FIG. 3). If a signal is detected either one or both of communication lines 42, 40, the processing unit 28 determines that the customer may be attempting to scan another item for purchase, and the routine advances to step 62.

Returning to step 64, if a bar code was not successfully read from the item being scanned, the routine 56 advances to step 70. In step 70, the processing unit 28 determines that the customer apparently tried to scan an item for purchase; however, the customer's attempt was unsuccessful. That is, the processing unit 28 concludes that the customer apparently scanned an item over the scanner device 22 because the video camera 24 generated an output signal on data communication line 42. However, since the scanner device 22 did not generate an output signal on the data communication line 40, the processing unit 28 concludes that either (1) the scanner device 22 did not read the bar code on the item that was passed over the scanner device 22, or (2) the scanner device 22 is not functioning properly.

As a result, the processing unit 28 causes the stored video segment of the previous scanning attempt, as captured by the video camera 24 and recorded by the video storage unit 35, to be played back on the display monitor 26 (step 70). That is, the processing unit 28 generates an output signal on data communication line 43 which causes the video storage unit 35 to retrieve the stored video segment of the previous scanning attempt. The video storage unit 35 then replays the video segment of the previous scanning attempt for display on the display monitor 26.

Figure 5:
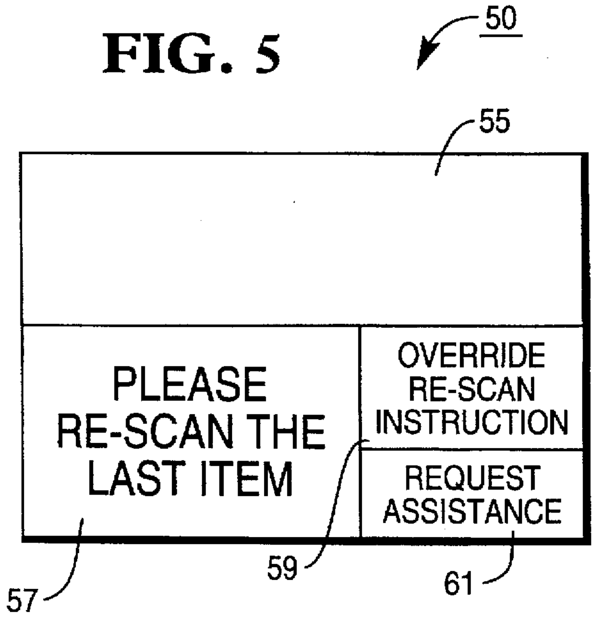
FIG. 5 is a screen display associated with a display monitor which displays instructions, and motion video during the itemization step shown in FIG. 4.

An exemplary screen display 53 which displays instructions and motion video is shown in FIG. 5. The display screen 53 includes a video playback area 55 for displaying the playback video communicated to the display monitor 26 from the video storage unit 35 across the communication line 45. As the video segment of the previous scanning attempt is replayed on the display screen 26, the routine 56 advances to step 72 where the processing unit 28 causes a message to be displayed on the display monitor 26 instructing the customer to re-scan the item that was shown in the video replay across the scanner device 22. As shown in FIG. 5, the message instructing the customer to re-scan the item is displayed in a message area 57 of the screen display 53.

After displaying the re-scan message in step 72, the routine 56 advances to step 74 where the processing unit 28 monitors the communication line 41 for a particular signal indicating that the customer desires to override the re-scan request. In particular, the screen display 53 includes a touch area 59 which the customer may touch in order to override, i.e. disregard, the re-scan instruction displayed in step 72.

It should be appreciated that an override of the re-scan request may be necessary where a customer inadvertently passes an object other than an item for purchase, e.g. the customer's purse, or the customer's empty hand, across the scanner device 22. In such a situation, a re-scan request is not warranted.

If the processing unit 28 determines that the customer has not touched the touch area 59 (i.e. has not overridden the re-scan request), the routine 56 advances to step 62 to process the re-scan. However, if the processing unit 28 determines that the customer has touched the touch area 59 (i.e. overridden the re-scan request), the routine 56 advances to step 78.

In step 78, the processing unit 28 may cause the stored video segment containing the previous unsuccessful scan attempt to be flagged for subsequent review by store personnel to insure that illicit activity did not occur. It should be appreciated that if customer identification or credit/debit card information was solicited in step 54 (FIG. 3), then the customer's account may be debited in the event that subsequent analysis of the flagged video segment reveals illicit activity by the customer. In addition, the information may be used to prevent the customer from subsequently using the checkout station 10. The routine 56 then advances to step 76.

In step 76, as previously discussed, the processing unit 28 may monitor the communication lines 40, 41, 42 and 48 in order to determine whether there are more items to be scanned. If the processing unit 28 determines that the checkout procedure is complete, the routine 56 advances to the finalization step 58 (FIG. 3). If the processing unit 28 determines that the checkout procedure is not complete, the routine advances to step 62.

Returning to step 62, if a scanning motion across the scanner device 22 is not detected, the routine 56 advances to step 66. Step 66 follows the same procedure outlined above with regard to step 64. In particular, the processing unit 28 scans or reads the data communication line 40 to determine whether the scanner device 22 has successfully read or otherwise captured the bar code associated with the item that was scanned. That is, the scanner device 22 generates an output signal which is sent to the processing unit 28 once the scanner device 22 successfully reads the product identification code off of the item scanned. If the code is successfully read from the item, the routine 56 advances to step 84. If the code is not successfully read from the item, the routine 56 advances to step 86.

Step 84 follows the same procedure outlined above with regard to step 68. In particular, the processing unit 28 determines that a successful checkout operation has been completed for the particular item selected for purchase. That is, the processing unit 28 determines that an item was scanned because the scanner device 22 generated an output signal on the data communication line 40. However, because the video camera 24 did not generate an output signal on the data communication line 42, the processing unit 28 concludes that the video camera 24 is not functioning properly. The processing unit 28 then communicates with the network 36 to obtain the price of the properly scanned item for use in generating a bill or receipt at the end of the checkout procedure. The routine 56 then advances to step 88.

In step 88, the processing unit 28 causes an entry or record to be made in an electronic error log (not shown) which notes the potential malfunction of the video camera 24 that was detected in step 84. If entries are added to the error log at a rate greater than a predetermined threshold, an error message could be sent across the network 36 requesting immediate maintenance attention.

The routine 56 then advances to step 90 where the processing unit 28 may monitor the communication lines 40, 41, 42 and 48 in order to determine whether there are more items to be scanned. If the processing unit 28 determines that the checkout procedure is complete, the routine 56 advances to the finalization step 58 (FIG. 3). If the processing unit 28 determines that the checkout procedure is not complete, the routine advances to step 62.

Returning to step 66, if the product identification code was not successfully read from the item being scanned, the routine 56 advances to step 86. In step 86, since the video camera 24 did not generate an output signal on the data communication line 42, and the scanner device 22 did not generate an output signal on the data communication line 40, the processing unit 28 concludes that there is no present attempt being made by a customer to scan or otherwise checkout an item. Thus, the routine 56 advances to step 62 to loop through the routine 56 once again.

Referring again to FIG. 5, the screen display 53 includes a touch area 61 which the customer may touch at any time during the checkout procedure in order to request assistance from the store personnel. That is, the processing unit 28 may continuously monitor or scan the data communication line 41 for a particular signal which indicates that the customer has touched the touch area 61. If the customer touches the touch area 61, the processing unit 28 may generate a message that is sent to the network 36 via the communication line 46 to indicate that the customer is in need of assistance.

It should be appreciated that the weight scale 20 may be used to enhance security during the checkout routine 56 (FIG. 4). The weight scale 20 may be used to monitor the insertion of items into and the removal of items from the grocery bags 16. Therefore, an output of the weight scale 20 may be coupled to the processing unit 28 to provide information to the processing unit 28 as to if and when a customer places an item into the grocery bag 16, and if and when the a customer removes and item from the grocery bag.

Monitoring the insertion of items into and the removal of items from the grocery bags 16 can also be achieved by using a video camera 24 which is capable of detecting the presence of motion within one or more "target areas". What is meant herein by use of the term "target areas" of the video camera 24 is a first target area adjacent to the first and second scanning windows 30, 32 which defines the maximum range in which an item can be successfully scanned as it is passed across the scanner device 22, and a second target area proximate the grocery bag 16 which defines an area above the grocery bag 16 wherein a customer must place an item into or remove an item from the grocery bag 16. Therefore, the processing unit 28 can communicate with the imaging software associated with the video camera 24 to determine if and when an item has been added to the grocery bag 16.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

For example, the self-service checkout station 10 may be equipped with a known automated teller machine (ATM). Moreover, it should be appreciated that the video camera 24, video storage unit 35, display screen 26, and input device 27 could be integrated into an ATM in order to reduce the number of components included in the self-service checkout station 10.

What is claimed is:

1. A self-service checkout station comprising:

a scanner which generates a first signal when the scanner detects a machine readable code associated with an item;

a sensor which generates a second signal when the sensor detects a motion used to scan the item across the scanner;

a recorder which generates a visual recording of the motion used to scan the item across the scanner; and a processing unit coupled to the scanner, the sensor and the recorder which causes the recorder to playback the visual recording on a display monitor when the processing unit receives the second signal but not the first signal.

2. The self-service checkout station of claim 1, wherein the recorder includes a camera which captures a video image of the motion used to scan the item across the scanner, and a storage unit which stores the video image.

3. The self-service checkout station of claim 2, wherein the sensor includes imaging software which analyzes the video image to detect the motion used to scan the item across the scanner.

4. The self-service checkout station of claim 2, wherein the video image is stored on a video tape associated with the storage unit.

5. The self-service checkout station of claim 1, wherein the recorder includes a camera which captures a digital image of the motion used to scan the item across the scanner, and a storage unit which stores the digital image.

6. The self-service checkout station of claim 5, wherein the sensor includes imaging software which analyzes the digital image to detect the motion used to scan the item across the scanner.

7. The self-service checkout station of claim 5, wherein the digital image is stored in a memory associated with the storage unit.

8. The self-service checkout station of claim 1, wherein the processing unit causes an instruction to be displayed on the display monitor when the processing unit receives the second signal but not the first signal.

9. A method of checking out an item through a self-service checkout station comprising the steps of:

generating a first signal when a scanner detects a machine readable code associated with an item;

generating a second signal when a sensor detects a motion used to scan the item across the scanner;

generating a visual recording of the motion used to scan the item across the scanner; and playing-back the visual recording on a display monitor when a processing unit receives the second signal but not the first signal.

10. The method of claim 9, wherein the generating a visual recording step includes the steps of:

capturing a video image of the motion used to scan the item across the scanner with a camera; and storing the video image in a storage unit.

11. The method of claim 10, wherein the generating a second signal step includes the step of:

analyzing the video image to detect the motion used to scan the item across the scanner.

12. The method of claim 11, wherein the analyzing step includes the step of:

analyzing the video image with imaging software to detect the motion used to scan the item across the scanner.

13. The method of claim 10, wherein the storing step includes the step of storing the video image on a video tape associated with the storage unit.

14. The method of claim 9, wherein the visually recording step includes the steps of:

capturing a digital image of the motion used to scan the item across the scanner with a camera; and storing the digital image in a storage unit.

15. The method of claim 14, wherein the generating a second signal step includes the step of:

analyzing the digital image to detect the motion used to scan the item across the scanner.

16. The method of claim 15, wherein the analyzing step includes the step of:

analyzing the digital image with imaging software to detect the motion used to scan the item across the scanner.

17. The method of claim 14, wherein the storing step includes the step of storing the digital image in a memory associated with the storage unit.

18. The method of claim 9, further including the step of:

displaying an instruction on the display monitor when the processing unit receives the second signal but not the first signal.

* * * * *